US012576903B2

(12) United States Patent   (10) Patent No.: US 12,576,903 B2
Fehr et al.   (45) Date of Patent: Mar. 17, 2026

(54) METHOD FOR CONTROLLING A STEER-BY-WIRE STEERING SYSTEM OF A ROAD VEHICLE WITH FEEDBACK ACTUATOR POSITION CALIBRATION

(71) Applicants: thyssenkrupp Presta AG, Eschen (LI); Honda Motor Co., Ltd., Tokyo (JP)

(72) Inventors: Johannes Fehr, Feldkirch (AT); Munetsugu Hanji, Wako (JP); Péter Kakas, Budapest (HU); Ryo Kato, Wako (JP); Hayato Miyakawa, Wako (JP); Satoshi Nakahara, Wako (JP); Imre Szepessy, Mauren (LI); Yoshinobu Watanabe, Wako (JP)

(73) Assignees: THYSSENKRUPP PRESATA AG, Eschen (LI); HONDA MOTOR CO., LTD., Tokyo (JP)

( * ) Notice: Subject to any disclaimer, the term of this patent is extended or adjusted under 35 U.S.C. 154(b) by 70 days.

(21) Appl. No.: 18/612,517

(22) Filed: Mar. 21, 2024

(65) Prior Publication Data

US 2024/0227916 A1    Jul. 11, 2024

Related U.S. Application Data

(63) Continuation of application No. PCT/EP2021/076017, filed on Sep. 22, 2021.

(51) Int. Cl.
 B62D 5/00 (2006.01)
 B62D 5/04 (2006.01)
(52) U.S. Cl.
 CPC ............. B62D 5/006 (2013.01); B62D 5/001 (2013.01); B62D 5/0481 (2013.01)

(58) Field of Classification Search
 CPC .... B62D 5/0487; B62D 3/126; B62D 5/0463; B62D 15/0235; B62D 5/0457;
 (Continued)

(56) References Cited

U.S. PATENT DOCUMENTS 5,465,210 A * 11/1995 Walenty ............. B62D 15/0245
                                                        701/1
6,260,655 B1 * 7/2001 Mukai .................. B62D 5/0469
                                                        180/446

(Continued)

FOREIGN PATENT DOCUMENTS

DE    10 2005 053 902 A1    5/2007
EP         3 929 061 A1    12/2021
JP         2007-230275 A    9/2007

OTHER PUBLICATIONS

Official Communication issued in International Patent Application No. PCT/EP2021/076017, mailed on Jun. 21, 2022.

*Primary Examiner* — Phutthiwat Wongwian
*Assistant Examiner* — Brian R Kirby
(74) *Attorney, Agent, or Firm* — Keating & Bennett, LLP

(57) ABSTRACT

A method for calibrating a position of a feedback actuator of a steer-by-wire steering system of a road vehicle includes moving the feedback actuator to a first end stop of the feedback actuator and from there moving the feedback actuator to a second end stop, recording a position of the two end stops and based thereon determining a newly defined center position, moving the feedback actuator to the newly defined center position, and storing the newly defined center position in a memory as an offset value of an absolute steering wheel angle.

7 Claims, 2 Drawing Sheets

(58) Field of Classification Search
CPC ...... B62D 15/025; G01M 17/06; G01L 5/221;
G01L 25/003
See application file for complete search history.

(56) References Cited

U.S. PATENT DOCUMENTS

| | | | | |
|---|---|---|---|---|
| 6,408,234 | B1 * | 6/2002 | Wittig | B62D 5/0466 |
| | | | | 180/443 |
| 6,926,112 | B2 * | 8/2005 | Husain | B62D 6/008 |
| | | | | 180/444 |
| 7,295,907 | B2 * | 11/2007 | Lu | B62D 15/0245 |
| | | | | 318/400.38 |
| 8,082,078 | B2 * | 12/2011 | Wittig | B62D 5/0469 |
| | | | | 701/41 |
| 9,327,762 | B2 * | 5/2016 | Oblizajek | B62D 5/0472 |
| 9,909,954 | B2 * | 3/2018 | Badiru | G01M 17/04 |
| 2004/0059486 | A1 * | 3/2004 | Takuma | G01D 5/2452 |
| | | | | 180/443 |
| 2006/0201737 | A1 * | 9/2006 | Fleck | B62D 5/008 |
| | | | | 180/446 |
| 2008/0281490 | A1 * | 11/2008 | Wittig | B62D 5/0457 |
| | | | | 701/41 |
| 2008/0306655 | A1 * | 12/2008 | Ukai | B62D 5/046 |
| | | | | 701/41 |
| 2011/0125450 | A1 * | 5/2011 | Lindenstruth | G01M 17/06 |
| | | | | 702/113 |
| 2013/0054074 | A1 | 2/2013 | Schreiber | |
| 2014/0238768 | A1 * | 8/2014 | Tamaizumi | B62D 5/0463 |
| | | | | 180/446 |
| 2014/0343791 | A1 * | 11/2014 | Suzuki | B62D 15/0235 |
| | | | | 701/41 |
| 2015/0046037 | A1 * | 2/2015 | Guilemond | B62D 3/12 |
| | | | | 701/41 |
| 2020/0391792 | A1 * | 12/2020 | Loussaut | G01M 17/06 |
| 2020/0391793 | A1 * | 12/2020 | Loussaut | G01L 5/221 |
| 2021/0024123 | A1 * | 1/2021 | Vizer | B62D 5/006 |

* cited by examiner

METHOD FOR CONTROLLING A STEER-BY-WIRE STEERING SYSTEM OF A ROAD VEHICLE WITH FEEDBACK ACTUATOR POSITION CALIBRATION

CROSS REFERENCE TO RELATED APPLICATIONS

This application claims the benefit of priority to PCT Application No. PCT/EP2021/076017 filed on Sep. 22, 2021. The entire contents of this application are hereby incorporated herein by reference.

BACKGROUND OF THE INVENTION

1. Field of the Invention

The present invention relates to methods for calibrating positions of feedback actuators of steer-by-wire steering systems of road vehicles and to steer-by-wire steering systems for road vehicles with feedback actuators.

2. Description of the Related Art

In steer-by-wire steering systems, there is no direct mechanical coupling between the steering wheel and the steering linkage and the vehicle wheels are moved directly by an electro motor. The maximum steering wheel angle is therefore no longer defined by mechanical stops in the steering gear. However, the maximum steering angle of the wheels is still limited in steer-by-wire steering systems. The driver must therefore be informed when a maximum steering angle is reached. A feedback actuator, which is located on the steering wheel or steering column and which imparts a steering feel to the steering handle, is used to limit the maximum steering angle of the steering wheel to a certain angle (or a predefined number of revolutions).

The absolute position of the feedback actuator must be calibrated before it is used for the first time, for example, at the end of the production cycle or in the workshop if the system is replaced in the vehicle. Further, the position of the end stop can change during the lifetime of the steering system. Most probably, the end stop position will shift to larger steering wheel angles during the lifetime of the steering system but it is also possible that a shift to smaller steering wheel angles might occur.

SUMMARY OF THE INVENTION

Example embodiments of the present invention provide methods for calibrating positions of feedback actuators of steer-by-wire steering systems of road vehicles which allows calibration of absolute positions of the feedback actuators.

A method for calibrating a position of a feedback actuator of a steer-by-wire steering system of a road vehicle includes moving the feedback actuator to a first end stop of the feedback actuator and from there moving the feedback actuator to a second end stop, recording a position of the two end stops and based thereon determining a newly defined center position, moving the feedback actuator to the newly defined center position, and storing the newly defined center position in a memory as an offset value of an absolute steering wheel angle.

This method is easy to carry out and allows calibration of the system during maintenance or operation.

Preferably, the method includes, if the end stops change during a lifetime of the steering system, recording a position of a changed end stop, and setting functions in the steering system using the end stop position to modified end stop positions.

This makes it possible to adapt to changes in the feedback actuator and makes the steering system more reliable.

It is advantageous that the stored feedback actuator end stop positions are updated during operation of the feedback actuator if a mechanical end stop is determined to be at a steering wheel angle smaller than a previously stored steering wheel angle.

Further, it is possible that the stored feedback actuator end stop positions are updated during operation of the feedback actuator if the mechanical end stop is determined to be at a steering wheel angle smaller than the previously stored one.

In an example embodiment, determining if the mechanical end stop is at a steering wheel angle smaller than the previously stored steering wheel angle is based on at least one of an estimated motor torque, a direction of the estimated motor torque, or a combination of a feedback actuator position and movement.

Updated feedback actuator end stop positions can be used in feedback actuator position-related functions for a torque request and/or to adjust a position request send to a road wheel actuator.

Further, a steer-by-wire steering system for a road vehicle includes a feedback actuator, a road wheel actuator, and a controller configured or programmed to control the feedback actuator and the road wheel actuator, and the controller is configured or programmed to perform the above described method.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will now be described with reference to the drawings.

DETAILED DESCRIPTION OF THE EXAMPLE EMBODIMENTS

Figure 1:
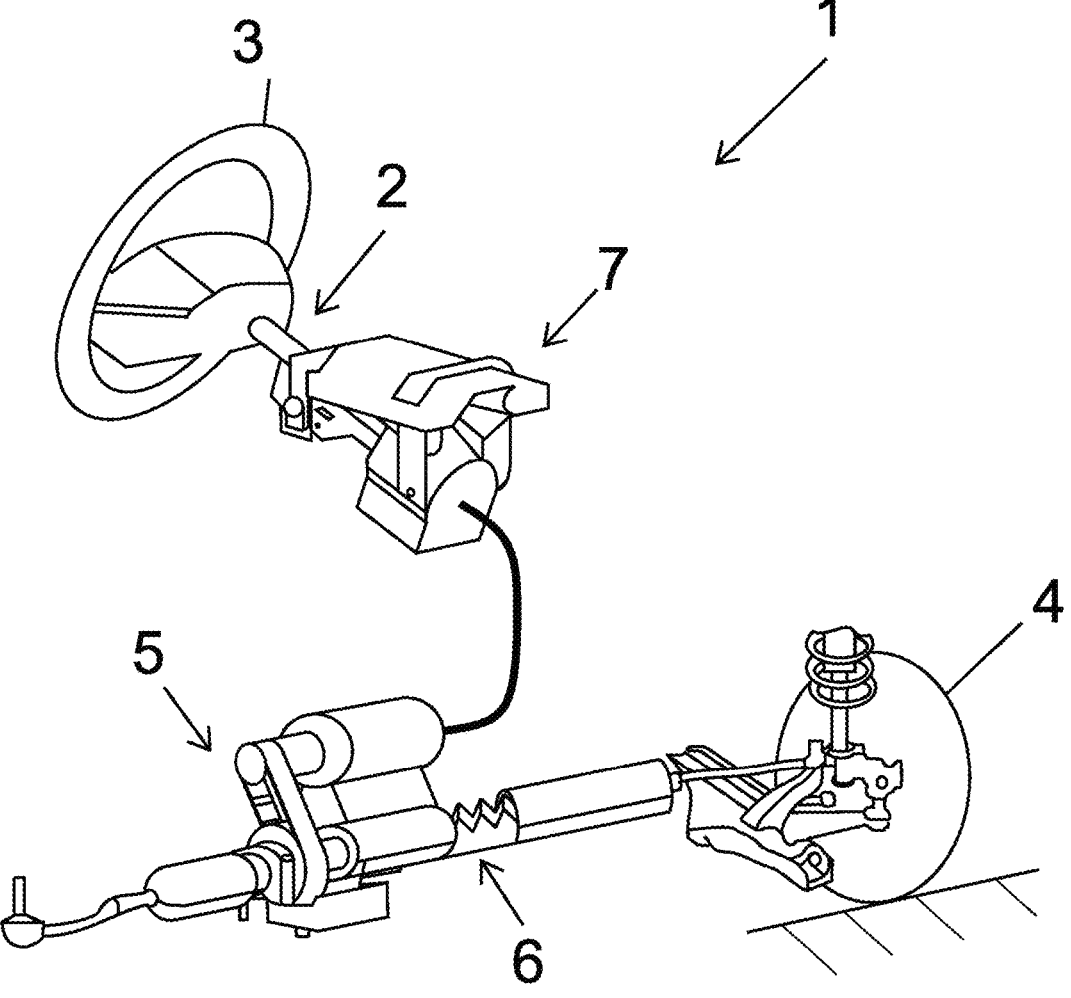
FIG. 1 is a schematic view of a steer-by-wire-steering system.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a recirculating ball gear.

When a driver operates the steering wheel 3, the steering shaft 2 is rotated, which is detected by a shaft sensor, which is not shown in the drawings. A controller is configured or programmed to calculate an operation signal for the road wheel actuator 5 from the signal detected by the shaft sensor. By operating the gear rack 6 with the operation signal, the road wheels 4 are turned. At the same time, forces introduced in the gear rack 6 from the road wheels 4 are recognized by another sensor not shown in the drawings, and a feedback signal is calculated, which is applied to the steering shaft 2 by a steering wheel actuator 7, also called a feedback actuator, so that the operator can recognize the feedback in the steering wheel 3.

Figure 2:
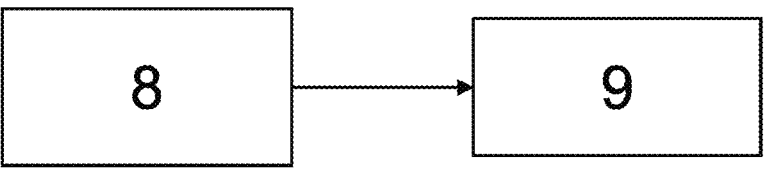
FIG. 2 is a block diagram representing feedback actuator end stop calibration.

As shown in FIG. 2, the position of the feedback actuator can be calibrated 8 during operation of the vehicle, after some time automatically or in a workshop.

In a first step of the calibration process, the feedback actuator moves to a first end stop and from there moves to a second end stop, e.g., with position control. The end stops are mechanically defined. The position of the two end stops is recorded. With the recorded information, the feedback actuator is moved back to a newly defined center position where it remains 9. The newly defined center position is stored in a memory as an offset value of the absolute steering wheel angle.

The feedback actuator torque and or position actuation could be used for this calibration procedure.

Figure 3:
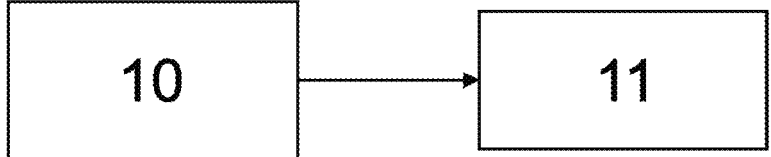
FIG. 3 is a block diagram representing end stop adaptation of the steering system.

If the end stops change during the lifetime of the steering system, the position of the changed end stop is recorded 10 and the functions in the system is set to the modified end stop positions 11 (see FIG. 3).

In detail, the stored feedback actuator end stop positions are updated during operation if the actual position of the feedback actuator is at a steering wheel angle greater than the stored position, and an algorithm detects the mechanical end stop at a steering wheel angle that is smaller than a previously stored steering wheel angle. The algorithm can detect the mechanical end stops based on an estimated motor torque, a direction of the estimated motor torque, and/or a combination of a feedback actuator position and movement.

The updated feedback actuator end stop positions are then used in feedback actuator position-related functions for a torque request (e.g., end stop feeling provision).

Additionally, it is possible to adjust a position request send to the road wheel actuator (virtual gear ratio) to the updated feedback actuator end stop positions.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for calibrating a position of a feedback actuator of a steer-by-wire steering system of a road vehicle, the method comprising:

moving the feedback actuator to a first mechanical end stop of the feedback actuator and from there moving the feedback actuator to a second mechanical end stop;

recording a position of the first and second mechanical end stops and based thereon determining a newly defined center position;

moving the feedback actuator to the newly defined center position; and storing the newly defined center position in a memory as an offset value of an absolute steering wheel angle; wherein the steer-by-wire steering system includes a steering wheel, a road wheel actuator to actuate road wheels, and the feedback actuator;

the feedback actuator applies a feedback torque to the steering wheel; and the positions of the first and second mechanical end stops are updated during operation of the feedback actuator if an actual position of the feedback actuator is at a steering wheel angle greater than a stored position.

2. The method according to claim 1, further comprising:

if the first and second mechanical end stops change, recording modified end stop positions of the first and second mechanical end stops, and setting functions performed by the steering system using the positions of the first and second mechanical end stops to the modified end stop positions.

3. The method according to claim 1, wherein stored feedback actuator end stop positions are updated during operation of the feedback actuator if a mechanical end stop is determined to be at a steering wheel angle smaller than a previously stored steering wheel angle.

4. The method according to claim 3, wherein determining if the mechanical end stop is at a steering wheel angle smaller than the previously stored steering wheel angle is based on at least one of an estimated motor torque, a direction of the estimated motor torque, or a combination of a feedback actuator position and movement.

5. The method according to claim 1, further comprising using updated feedback actuator end stop positions in feedback actuator position-related functions for a torque request.

6. The method according to claim 1, further comprising adjusting a position request to send to a road wheel actuator updated feedback actuator end stop positions.

7. A steer-by-wire steering system for a road vehicle comprising:

a feedback actuator;

a road wheel actuator; and a controller configured or programmed to control the feedback actuator and the road wheel actuator; wherein the controller is configured or programmed to perform the method according to claim 1.

* * * * *